(12) United States Patent
Ding

(10) Patent No.: US 8,097,060 B2
(45) Date of Patent: Jan. 17, 2012

(54) LAMINATE FILTER

(75) Inventor: Yuqing Ding, Charlotte, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 653 days.

(21) Appl. No.: 12/233,292

(22) Filed: Sep. 18, 2008

(65) Prior Publication Data

US 2010/0064644 A1    Mar. 18, 2010

(51) Int. Cl.
*B01D 50/00* (2006.01)

(52) U.S. Cl. ........... 55/484; 55/483; 55/497; 55/498; 55/500; 55/501; 55/463; 55/520; 55/521; 96/273

(58) Field of Classification Search ........... 55/483–484, 55/497–498, 500–501, 463, 520–521, 523
See application file for complete search history.

(56) References Cited

U.S. PATENT DOCUMENTS

| | | | |
|---|---|---|---|
| 3,941,571 A | 3/1976 | Getzin | |
| 3,962,097 A | 6/1976 | Reiman et al. | |
| 4,452,619 A | 6/1984 | Wright et al. | |
| 4,488,966 A | 12/1984 | Schaeffer | |
| 4,615,804 A | 10/1986 | Wright | |
| 5,034,023 A * | 7/1991 | Thompson | 205/634 |
| 5,100,551 A * | 3/1992 | Pall et al. | 210/346 |
| 5,128,039 A | 7/1992 | Gabrielson | |
| 5,298,046 A * | 3/1994 | Peisert | 55/486 |
| 5,316,676 A * | 5/1994 | Drori | 210/411 |
| 5,320,657 A | 6/1994 | Adams | |
| 5,456,069 A * | 10/1995 | Haerle | 55/498 |
| 5,531,892 A | 7/1996 | Duffy | |
| 5,655,212 A * | 8/1997 | Sekhar et al. | 428/552 |
| 5,660,606 A * | 8/1997 | Adamini | 55/337 |
| 5,814,219 A | 9/1998 | Friedmann et al. | |
| 5,866,230 A * | 2/1999 | Maus | 428/116 |
| 5,908,480 A * | 6/1999 | Ban et al. | 55/482 |
| 5,916,531 A * | 6/1999 | Pan | 422/211 |
| 6,068,771 A * | 5/2000 | McDermott et al. | 210/321.83 |
| 6,280,824 B1 * | 8/2001 | Insley et al. | 428/172 |
| 6,391,200 B2 * | 5/2002 | Pulek et al. | 210/497.1 |
| D468,007 S | 12/2002 | Osendorf et al. | |
| 6,540,816 B2 * | 4/2003 | Allie et al. | 95/278 |
| 7,160,361 B2 * | 1/2007 | Meiller et al. | 95/143 |

(Continued)

FOREIGN PATENT DOCUMENTS

| DE | 952 795 C | 11/1956 |
|---|---|---|
| DE | 1 948 704 A1 | 4/1971 |
| GB | 764911 | 1/1957 |

OTHER PUBLICATIONS

PCT International Search Report, International application No. PCT/US2009/057177, International Filing Date: Sep. 16, 2009, Applicant: Scott Technologies, Inc., Mail Date: Nov. 13, 2009, (4) pages.

*Primary Examiner* — Jason M Greene
*Assistant Examiner* — Dung H Bui
(74) *Attorney, Agent, or Firm* — Charles H. Livingston; Dean Small; The Small Patent Law Group

(57) ABSTRACT

A filter includes a spacing member and a filter element having two layers laminated together with the spacing member such that the spacing member extends between the filter element layers. The spacing member spaces apart the filter element layers to define an opening between the filter element layers.

12 Claims, 8 Drawing Sheets

U.S. PATENT DOCUMENTS

| | | |
|---|---|---|
| 7,217,333 B2 | 5/2007 | Sundet et al. |
| 7,235,115 B2 | 6/2007 | Duffy et al. |
| 7,320,723 B2 * | 1/2008 | Sewell, Sr. .................. 55/512 |
| 7,455,709 B2 * | 11/2008 | Ohno et al. .................. 55/523 |
| 2002/0174770 A1 * | 11/2002 | Badeau et al. .................. 95/273 |
| 2008/0264022 A1 * | 10/2008 | Zengerle et al. .................. 55/520 |

* cited by examiner

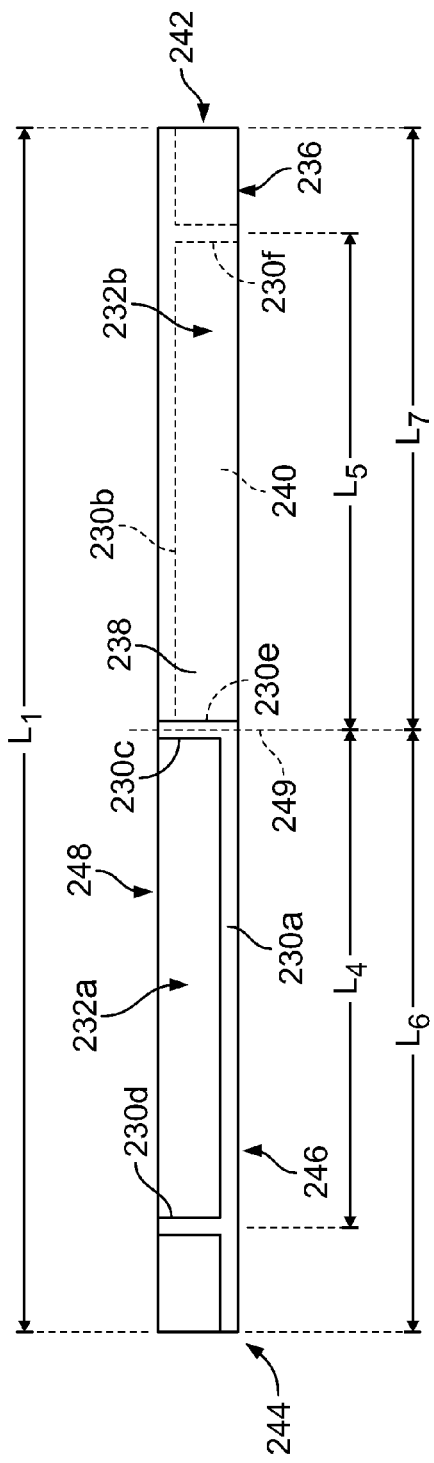
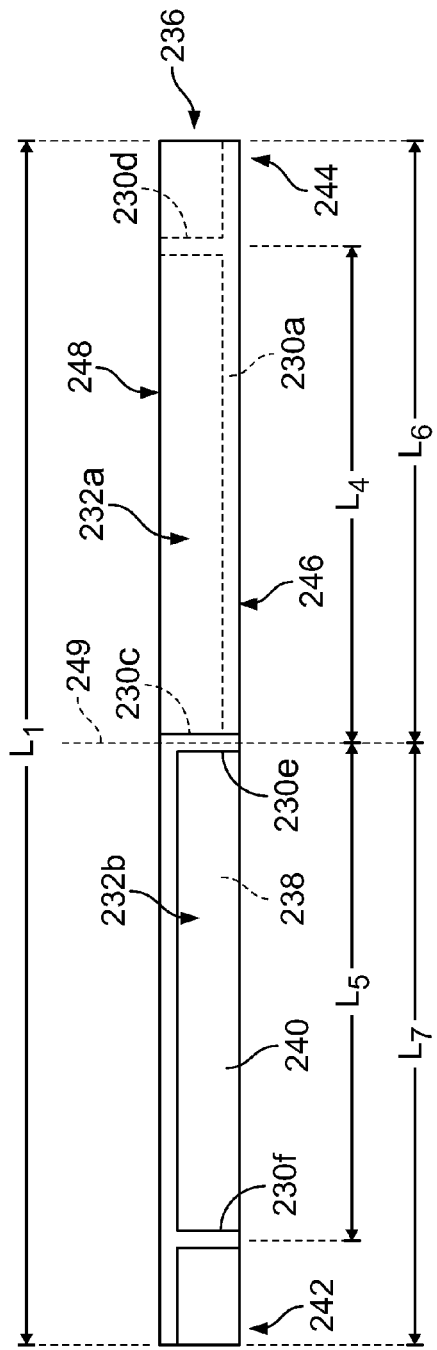

LAMINATE FILTER

BACKGROUND OF THE INVENTION

The subject matter described and/or illustrated herein relates generally to filters, and more particularly, to a laminate filter.

Filters are used to in a wide variety of systems and environments for filtering a wide variety of fluids. For example, rectangular filters are often used in heating and air-conditioning ducts to filter air used to heat or cool a building. Other examples include radial flow filters used on board a vehicle, and circular filters used in gas mask canisters.

Filters are often pleated to increase an effective surface area of the filter and therefore reduce flow resistance through the filter and increase an efficiency of the filter. The performance of a pleated filter is enhanced or diminished by the ability of the fluid being filtered to pass freely and completely through the filter. In many cases, a distribution of fluid flow through pleated filters is not even across the surface area of the filter. For example, if the pleats are unevenly distributed across the filter the distribution of fluid flow through the filter may be uneven across the surface area of the filter. Moreover, the pleats may deform, collapse, and/or bunch together such that some of the surface area of the filter is reduced and/or obstructed, for example due to fluid pressure applied to an intake side of the filter. Particulates and other debris that collect at the corners of the pleats may also obstruct some of the surface area of the filter. An uneven fluid flow distribution through a filter may increase a pressure drop across the filter and thereby increase flow resistance through the filter, which may decrease the efficiency and/or performance of the filter.

There is a need for a filter having a more even flow distribution across a surface area thereof as compared with at least some known filters.

BRIEF DESCRIPTION OF THE INVENTION

In one embodiment, a filter includes a spacing member and a filter element having two layers laminated together with the spacing member such that the spacing member extends between the filter element layers. The spacing member spaces apart the filter element layers to define an opening between the filter element layers.

Optionally, the filter element layers are spaced apart by the spacing member approximately the same amount along an approximate entirety of opposing surfaces of the filter element layers. The filter element layers may optionally extend approximately parallel to each other. In some embodiments, the filter element layers include an approximately rectangular shape or include a disk shape. Optionally, each of the filter element layers extends a length along an approximately spiral path.

In some embodiments, at least one of the filter element layers includes opposite first and second surfaces, the spacing member extends on the first surface, and another spacing member extends on the second surface. Optionally, at least one of the filter element layers includes opposite first and second surfaces each extending between a first edge portion of the filter element layer and a second edge portion of the filter element layer that is opposite the first edge portion, wherein the spacing member extends on the first surface adjacent the first edge portion and another spacing member extends on the second surface adjacent the second edge portion.

In another embodiment, a filter is provided. The filter assembly includes a housing and a filter held within the housing. The filter includes a spacing member and a filter element having two layers laminated together with the spacing member such that the spacing member extends between the filter element layers. The spacing member spaces apart the filter element layers to define an opening between the filter element layers.

In another embodiment, a filter includes first and second spacing members, and a filter element comprising first, second, and third layers extending approximately parallel to each other. The first, second, and third filter element layers are laminated together with the first and second spacing members such that the first spacing member extends between the first and second filter element layers and the second spacing member extends between the second and third filter element layers. The first spacing member spaces apart the first and second filter element layers to define a first opening between the first and second filter element layers. The second spacing member spaces apart the second and third filter element layers to define a second opening between the second and third filter element layers.

BRIEF DESCRIPTION OF THE DRAWINGS

FIG. 15 is a top plan view of the filter element layer shown in FIG. 14 illustrating an exemplary embodiment of a spacing member positioned on the filter element layer.

FIG. 16 is a bottom plan view of the filter element layer shown in FIG. 14 illustrating another spacing member positioned on the filter element layer.

DETAILED DESCRIPTION OF THE INVENTION

Figure 1:
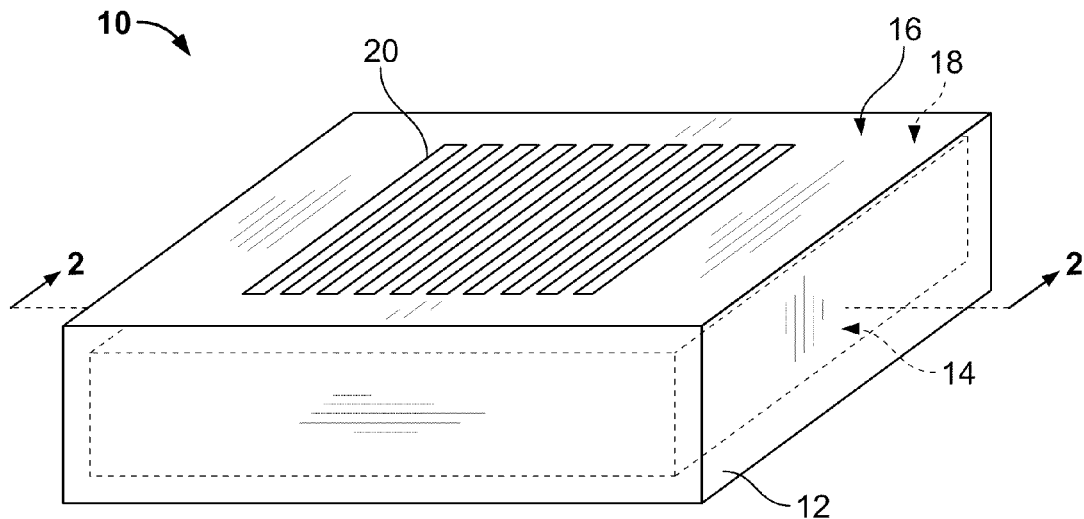
FIG. 1 is a perspective view of an exemplary embodiment of a filter assembly.
Figure 2:
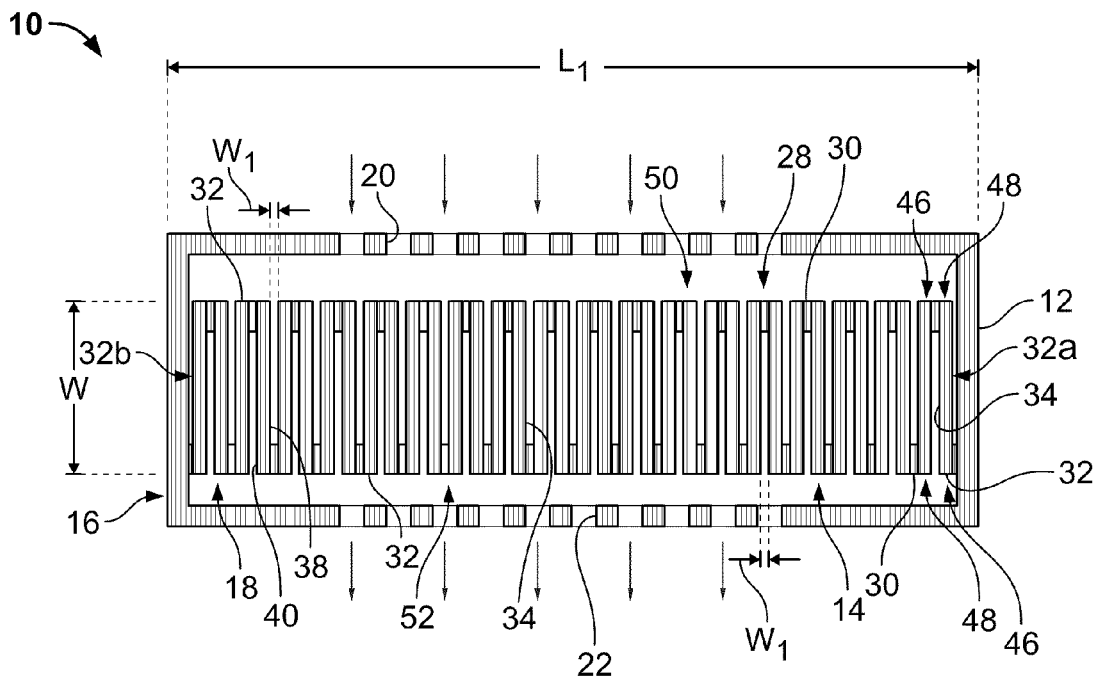
FIG. 2 is a cross-sectional view of the filter assembly shown in FIG. 1 taken along line 2-2 of FIG. 1.

FIG. 1 is a perspective view of an exemplary embodiment of a filter assembly 10. FIG. 2 is a cross-sectional view of the filter assembly 10 taken along line 2-2 of FIG. 1. The filter assembly 10 includes a housing 12 and a laminate filter 14 held by the housing 12. The housing 12 includes a body 16 that defines an internal cavity 18. The housing body 16 includes a plurality of intake openings 20 that communicate with the cavity 18 for receiving a flow of fluid into the cavity 18. The housing body 16 also includes a plurality of discharge openings 22 (not shown in FIG. 1) that communicate with the cavity 18 for discharging fluid from the cavity 18. As will be described below, the filter 14 is held within the cavity 18 for filtering the fluid flowing through the cavity 18.

In the exemplary embodiment of FIGS. 1-5, the housing 12 has an approximately rectangular shape. However, alternatively the housing 12 may include any other suitable shape(s) that enables the filter assembly 10 to function as described and/or illustrated herein. Moreover, in the exemplary embodiment of FIGS. 1-5, the intake openings 20 are located within a side-wall 24 of the housing body 16 and the discharge openings 22 are located within a side-wall 26 that is opposite the side-wall 24. However, the intake openings 20 and the discharge openings 22 may each include any suitable shape(s) and may each be located anywhere on the housing body 16, including anywhere relative to each other, that enables the filter assembly 10 to function as described and/or illustrated herein. Although ten intake openings 20 and ten discharge openings 22 are shown, the housing body 16 may include any number of intake openings 20 and any number of discharge openings 22, whether or not the number of intake openings 20 is the same as the number of discharge openings 22.

As can be seen in FIG. 2, the filter 14 includes a filter element, generally designated by the reference numeral 28, and a plurality of spacing members 30. The filter element 28 is defined by a plurality of filter element layers 32 that are laminated together with the spacing members 30. As used herein, the terms "laminate" and "laminated" refer to any two or more layers of one or more materials that are superposed on each other. As will be described below, the spacing members 30 extend between adjacent filter element layers 32. The spacing members 30 thereby space apart the filter element layers 32 to define openings 34 between the filter element layers 32.

Figure 3:
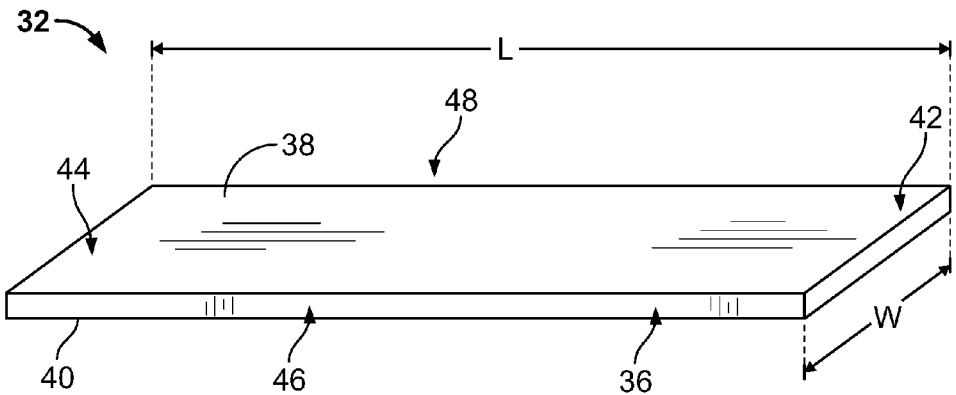
FIG. 3 is a perspective view of an exemplary embodiment of a filter element layer of the filter assembly shown in FIGS. 1 and 2.

FIG. 3 is a perspective view of an exemplary embodiment of a filter element layer 32. In the exemplary embodiment of FIGS. 1-5, the filter element layer 32 includes an elongate body 36 having a pair of opposite surfaces 38 and 40. The body 36 extends a length L between a pair of opposite end portions 42 and 44. The body 36 extends a width W between a pair of opposite edge portions 46 and 48 that intersect the surfaces 38 and 40. In the exemplary embodiment of FIGS. 1-5, the body 36 of each filter element layer 32 is elongate, approximately planar, and includes an approximately rectangular shape. However, alternatively the body 36 of each filter element layer 32 may include any other suitable shape(s) that enables the filter assembly 10 to function as described and/or illustrated herein.

Figure 4:
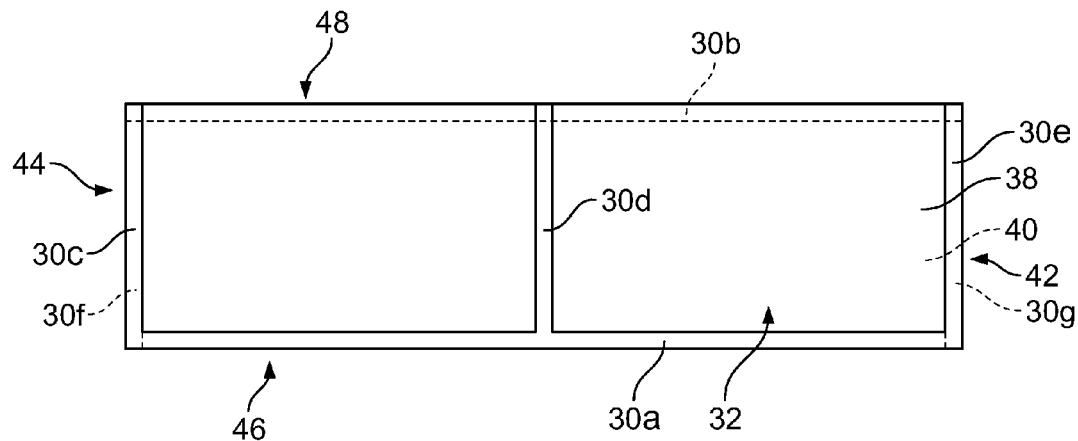
FIG. 4 is a top plan view of the filter element layer shown in FIG. 3 illustrating an exemplary embodiment of a spacing member positioned on the filter element layer.
Figure 5:
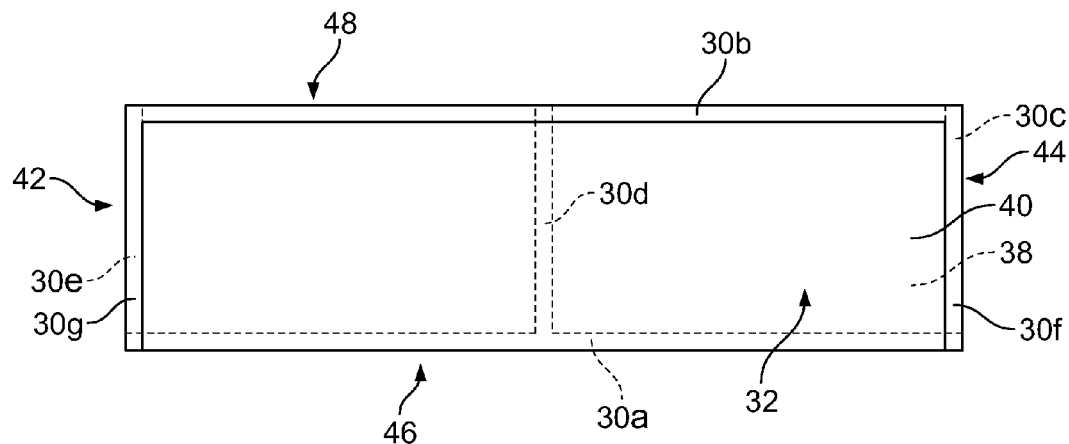
FIG. 5 is a bottom plan view of the filter element layer shown in FIG. 3 illustrating another spacing member positioned on the filter element layer.

FIGS. 4 and 5 are top and bottom plan views, respectively, of one of the filter element layers 32. Each filter element layer 32 includes a spacing member 30a positioned on the surface 38. In the exemplary embodiment of FIGS. 1-5, the spacing member 30a is positioned on the surface 38 adjacent the edge portion 46. However, the spacing member 30a may be positioned at any location on the surface 38 that enables the spacing member 30a to function as described and/or illustrated herein. Each filter element layer 32 also includes another spacing member 30b positioned on the surface 40. In the exemplary embodiment of FIGS. 1-5, the spacing member 30b is positioned on the surface 40 adjacent the edge portion 48. However, the spacing member 30b may be positioned at any location on the surface 40 that enables the spacing member 30b to function as described herein.

One or more other spacing members 30 may optionally be positioned on the surfaces 38 and/or 40. For example, in the exemplary embodiment of FIGS. 1-5, three spacing members 30c, 30d, and 30e are positioned on the surface 38 and two spacing members 30f and 30g are positioned on the surface 40. Specifically, the spacing members 30c and 30e are positioned on the surface 38 adjacent the end portions 44 and 42, respectively, of the body 36. Similarly, the spacing members 30f and 30g are positioned on the surface 40 adjacent the end portions 44 and 42, respectively. The spacing member 30d is positioned on the surface 38 at approximately a center of the length L of the body 36. The spacing members 30c-g facilitate reinforcing the body 36 of the filter element layer 32. For example, the spacing members 30c-g facilitate maintaining an approximately consistent amount of spacing between adjacent filter element layers 32 along the length L and width W of the filter element layers 32.

Although five spacing members 30c-g are shown, the body 36 of each of the filter element layers 32 may include any number of spacing members 30 in addition to the spacing members 30a and 30b. Moreover, the surfaces 38 and 40 may each include any number of spacing members 30 in addition to the spacing members 30a and 30b, respectively. Furthermore, the spacing members 30 that are in addition to the spacing members 30a and 30b (e.g., the spacing members 30c-g) may each have any other suitable location on the body 36 than is shown that enables the spacing members 30 to function as described and/or illustrated herein.

Referring again to FIG. 2, to assemble the filter 14, the filter element layers 32 are laminated together with the spacing members 30 as shown in FIG. 2. Specifically, the filter element layers 32 are stacked on top of each other such that the surfaces 38 and 40 of adjacent filter element layers 32 face (also referred to herein as oppose) each other. The spacing members 30 extend between adjacent filter element layers 32 within the stack, and along with the filter element layers 32 form the laminate structure of the filter 14 shown in FIG. 2. In the exemplary embodiment of FIGS. 1-5, the filter element layers 32 are stacked such that the filter element layers 32 extend approximately parallel to each other. For example, in the exemplary embodiment of FIGS. 1-5, the surfaces 38 and 40 of each filter element layer 32 extend approximately parallel to the surfaces 38 and 40 of the other filter element layers 32. However, the filter element layers 32 may alternatively extend at one or more non-parallel angles relative to each other. In the exemplary embodiment, the filter 14 has a rectangular shape such that the filter 14 is a rectangular filter. However, alternatively the filter 14 may include any other suitable shape(s) that enables the filter assembly 10 to function as described and/or illustrated herein.

As should be apparent from FIG. 2, the orientation of each filter element layer 32 is inverted relative to the orientation of the adjacent filter element layer(s) 32. Specifically, each filter element layer 32 is positioned relative to the adjacent filter element layers 32 such that the position of the edge portions 46 and 48 is inverted relative to the position of the edge portions 46 and 48 of the adjacent filter element layers 32. As described above with respect to FIGS. 4 and 5, each filter element layer 32 includes a spacing member 30a positioned on the surface 38 adjacent the edge portion 46 and a spacing member 30b positioned on the surface 40 adjacent the edge portion 48. The reference numerals 30a-g are used in FIGS. 4 and 5 for reference only. It should be apparent from FIG. 2 that spacing members 30a, 30c, and 30e of one filter element layer 32 will be the spacing members 30b, 30f, and 30g, respectively, of one of the adjacent filter element layers 32, and vice versa. In the exemplary embodiment of FIGS. 1-5 the outermost filter element layers 32a and 32b each include a spacing member 30 positioned on the surfaces 38 and 40, respectively. Alternatively, the filter element layers 32a and/or 32b may not include a spacing member 30 positioned on the surfaces 38 and 40, respectively.

The laminate structure of the filter 14 shown in FIG. 2 may be held together using any suitable method, structure, means, and/or the like. In the exemplary embodiment of FIGS. 1-5, the spacing members 30 are each tape that has an adhesive on both sides thereof such that each spacing member 30 adheres to both of the adjacent filter element layers 32 that the particular spacing member 30 extends between. The tape used as the spacing members 30 may be any suitable type of tape, such as, but not limited to, sealing tape and/or the like. The spacing members 30 are not limited to being tape. Rather, the spacing members 30 may each be fabricated from any suitable material(s) and include any suitable structure that enables the spacing members 30 to function as described and/or illustrated herein. Other examples of the material(s) and/or structure(s) of the spacing members 30 include, but are not limited to, an adhesive (such as, but not limited to, epoxy, glue, and/or the like), string, plastic, rubber, silicone, and/or the like. Although in the exemplary embodiment of FIGS. 1-5 the spacing members 30 are tape and therefore include an adhesive, in some embodiments the spacing members 30 do not include an adhesive.

As described above, the spacing members 30 space apart the filter element layers 32 to define the openings 34 between the filter element layers 32. Specifically, the openings 34 are defined between the surfaces 38 and 40 of adjacent filter element layers 32. Because each filter element layer 32 is inverted relative to adjacent filter element layers 32, along a length $L_1$ of the filter 14 the openings 34 alternate between being closed (by the spacing member 30) and being open on both an intake side portion 50 of the filter 14 and a discharge side portion 52 of the filter 14.

In the exemplary embodiment of FIGS. 1-5, the spacing elements 30 space apart the surfaces 38 and 40 of adjacent filter element layers 32 approximately the same amount, indicated herein by a width $W_1$ of the openings 34, along an approximate entirety of the length L (FIG. 3) and width W of the adjacent filter element layers 32. In other words, the surfaces 38 and 40 of adjacent filter element layers 32 are spaced apart from each other approximately the same amount along an approximate entirety of the surfaces 38 and 40. Accordingly, in the exemplary embodiment of FIGS. 1-5, the openings 34 have approximately the width $W_1$ along an approximate entirety of the length L and width W of the adjacent filter element layers 32, excepting portions of the openings 34 that are partially or completely blocked by a spacing member 30. Of course, in some embodiments the spacing between adjacent filter element layers 32 may not be exactly the same along the approximate entirety of the length L and width W of the adjacent filter element layers 32 due to, for example, but not limited to, manufacturing tolerances, deformation of the filter element layers 32 during operation of the filter assembly 10, and/or the like. Moreover, in some embodiments, the spacing between adjacent filter element layers 32 is approximately the same along only a portion of the length L and width W of the filter element layers 32, such as, but not limited to, along at least approximately 80% or at least approximately 90% of the length L and width W of the filter element layers 32. The size of each of the spacing members 30, including any and/or all components thereof, is selected to provide the desired amount of spacing (i.e., the width $W_1$ of the openings 34) between the adjacent filter element layers 32, whether or not the amount of spacing is variable or is approximately the same along the length L and width W of the filter element layers 32.

In the exemplary embodiment of FIGS. 1-5, each of the filter element layers 32 is a separate layer. Alternatively, one or more of the adjacent pairs of filter element layers 32 may be formed from a single uninterrupted length of material that is bent to form the two adjacent filter element layers 32 such that the end portions 42 or 44 of the adjacent pair of filter element layers 32 are connected together. In some embodiments, all of the filter element layers 32 are formed from single uninterrupted length of material bent such that the adjacent pairs of filter element layers 32 are connected together at alternating end portions 42 and 44.

Although thirty six filter element layers 32 are shown in FIG. 2, the filter 14 may include any number of filter element layers 32. Moreover, the filter 14 may include any number of spacing members 30 for spacing apart any number of filter element layers 32.

In operation, fluid enters the cavity 18 of the filter housing 12 through the intake openings 20. The fluid flows into the openings 34 that are open on the intake side portion 50 and through the filter element layers 32, thereby being filtered by the filter element layers 32. The filtered fluid then flows out the openings 34 that are open on the discharge side portion 52 of the filter 14 and exits the filter assembly 10 through the discharge openings 22 of the filter housing 12. The filter assembly 10 may filter any fluid, such as, but not limited to, a liquid, a slurry, a gas, a gas containing solid particulates, a sludge, a slush, and/or the like. The filter assembly 10 may be used in any suitable environment and with any suitable machine, system, structure, and/or the like, such as, but not limited to, within the air duct (not shown) of a building (not shown) and/or the like.

Figure 6:
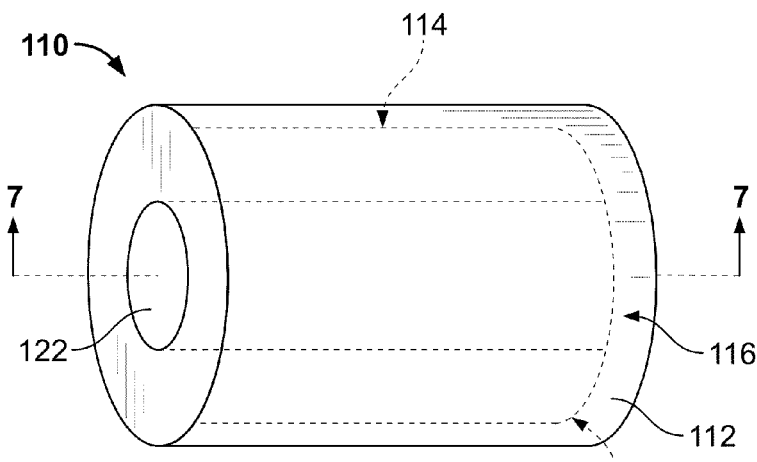
FIG. 6 is a perspective view of another exemplary embodiment of a filter assembly.
Figure 7:
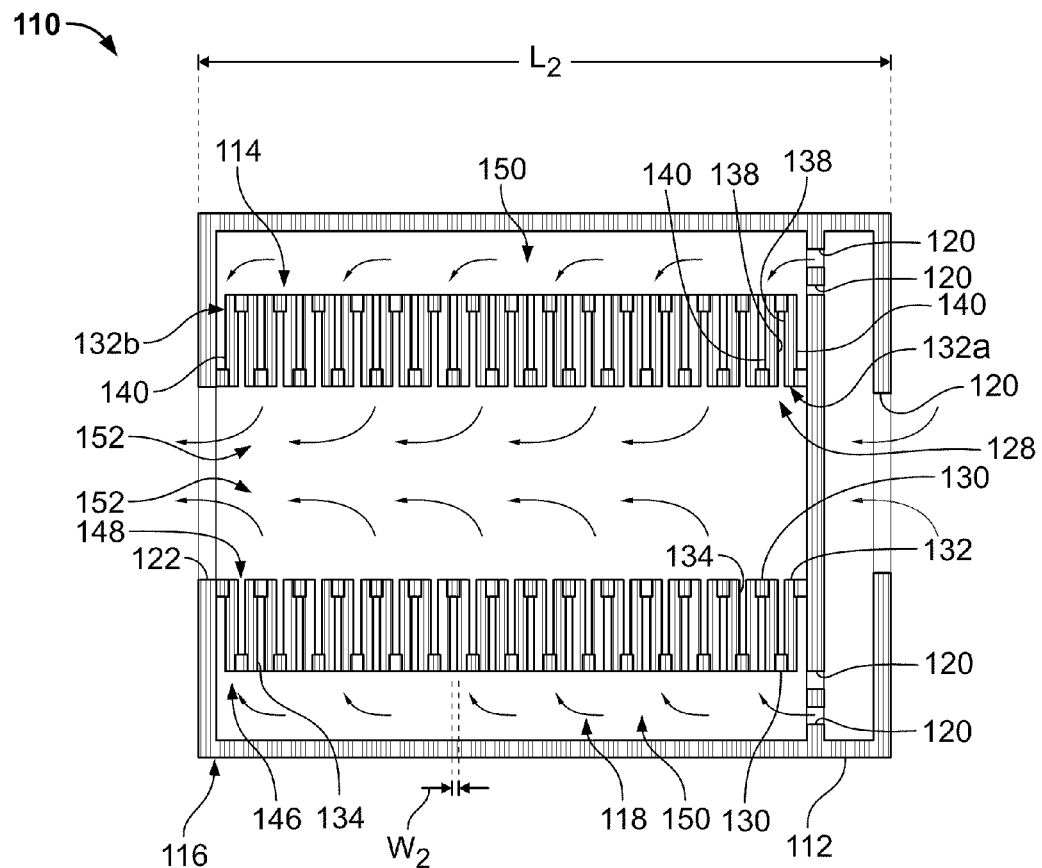
FIG. 7 is a cross-sectional view of the filter assembly shown in FIG. 6 taken along line 7-7 of FIG. 6.

FIG. 6 is a perspective view of another exemplary embodiment of a filter assembly 110. FIG. 7 is a cross-sectional view of the filter assembly 110 taken along line 7-7 of FIG. 6. The filter assembly 110 includes a housing 112 and a laminate filter 114 held by the housing 112. The housing 112 includes a body 116 that defines an internal cavity 118. The housing body 116 includes a plurality of intake openings 120 (not shown in FIG. 6) that communicate with the cavity 118 for receiving a flow of fluid into the cavity 118. The housing body 116 also includes a discharge opening 122 that communicates with the cavity 118 for discharging fluid from the cavity 118. As will be described below, the filter 114 is held within the cavity 118 for filtering the fluid flowing through the cavity 118.

In the exemplary embodiment of FIGS. 6-10, the housing 112 has an approximately cylindrical shape. However, alternatively the housing 112 may include any other suitable shape(s) that enables the filter assembly 110 to function as described and/or illustrated herein. Moreover, the intake openings 120 and the discharge opening 122 may each include any suitable shape(s) and may each be located anywhere on the housing body 116, including anywhere relative to each other, that enables the filter assembly 110 to function as described and/or illustrated herein. Although five intake openings 120 and one discharge opening 122 are shown, the housing body 116 may include any number of intake openings 120 and any number of discharge openings 122, whether or not the number of intake openings 120 is the same as the number of discharge openings 122.

As can be seen in FIG. 7, the filter 114 includes a filter element, generally designated by the reference numeral 128, and a plurality of spacing members 130. The filter element 128 is defined by a plurality of filter element layers 132 that are laminated together with the spacing members 130. As will be described below, the spacing members 130 extend between adjacent filter element layers 132. The spacing members 130 thereby space apart the filter element layers 132 to define openings 134 between the filter element layers 132.

Figure 8:
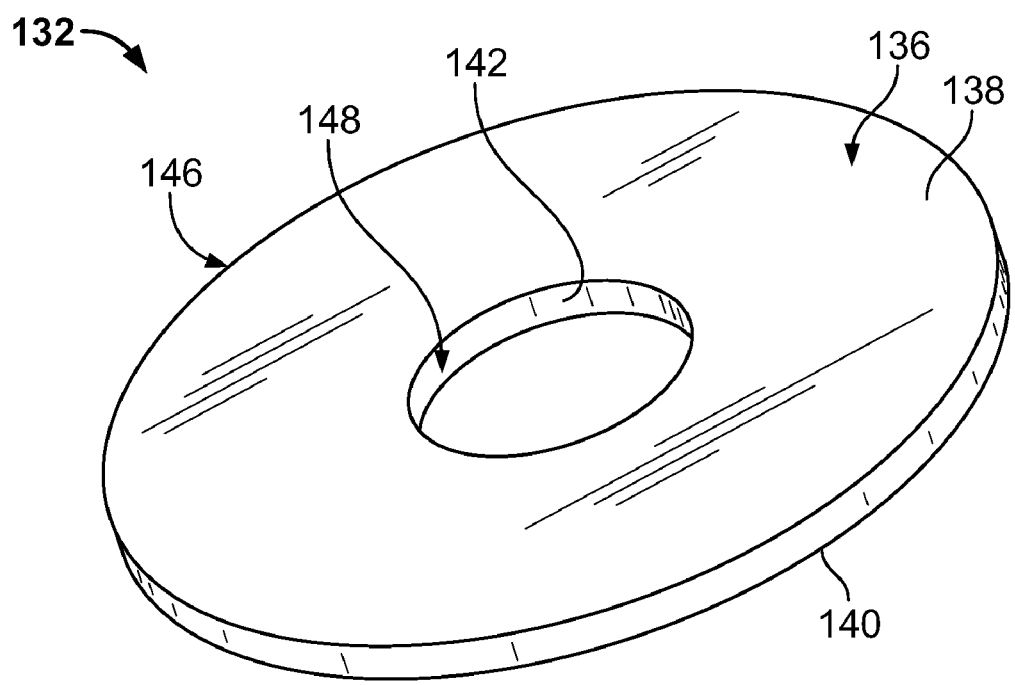
FIG. 8 is a perspective view of an exemplary embodiment of a filter element layer of the filter assembly shown in FIGS. 6 and 7.

FIG. 8 is a perspective view of an exemplary embodiment of a filter element layer 132. In the exemplary embodiment of FIGS. 6-10, the filter element layer 132 includes a body 136 having a pair of opposite surfaces 138 and 140. The body 136 includes a central opening 142, a radially outer edge portion 146 and a radially inner edge portion 148. In the exemplary embodiment of FIGS. 6-10, the body 136 of each filter element layer 132 is approximately planar and includes an approximately disk shape. However, alternatively the body 136 of each filter element layer 132 may include any other suitable shape(s) that enables the filter assembly 110 to function as described and/or illustrated herein. Moreover, in the exemplary embodiment of FIGS. 6-10, the central opening 142 includes a circular shape. However, alternatively the central opening 142 may include have any other suitable shape(s) that enables the filter assembly 110 to function as described and/or illustrated herein.

Figure 9:
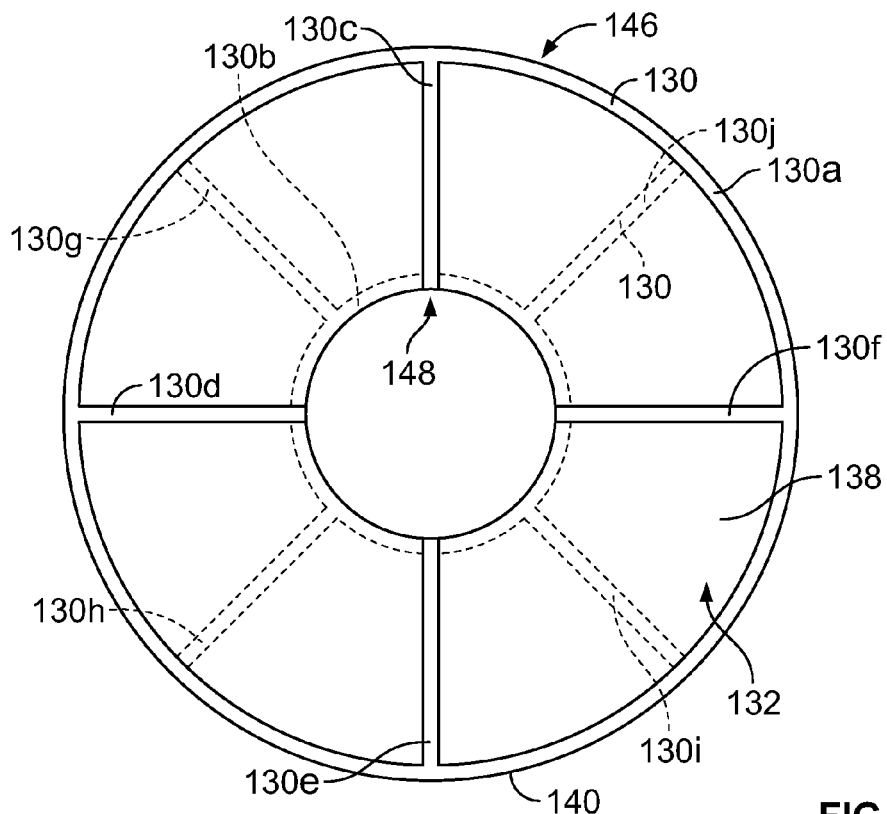
FIG. 9 is a top plan view of the filter element layer shown in FIG. 8 illustrating an exemplary embodiment of a spacing member positioned on the filter element layer.
Figure 10:
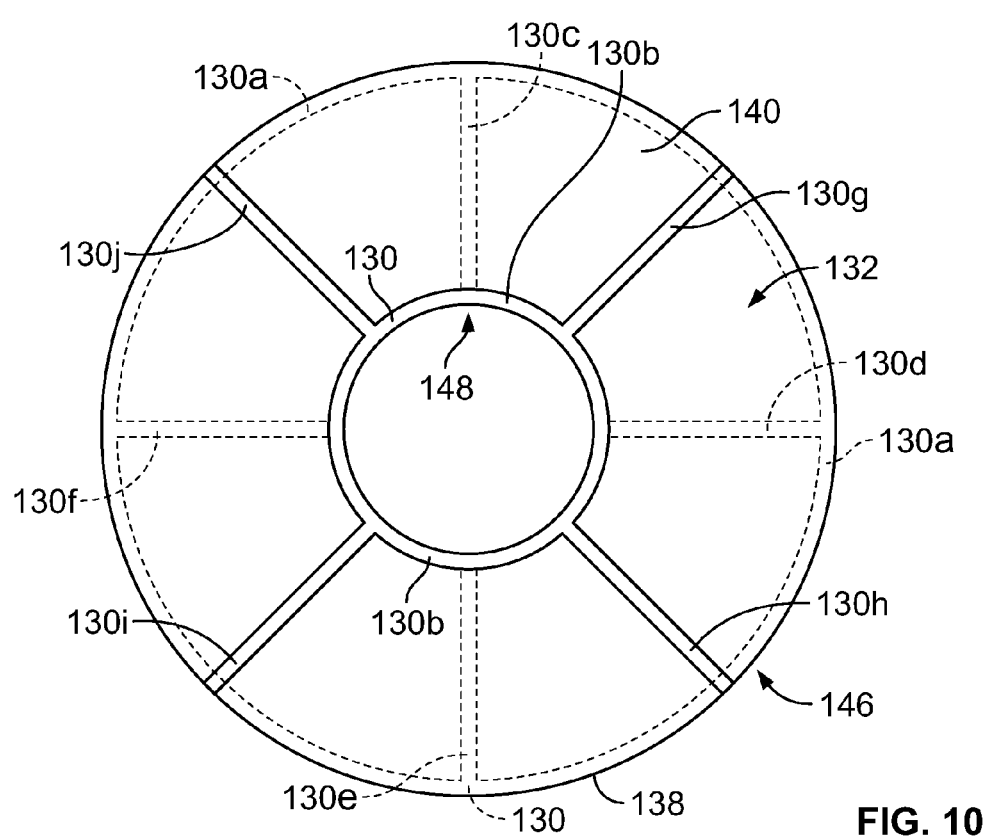
FIG. 10 is a bottom plan view of the filter element layer shown in FIG. 8 illustrating another spacing member positioned on the filter element layer.

FIGS. 9 and 10 are top and bottom plan views, respectively, of one of the filter element layers 132. Each filter element layer 132 includes a spacing member 130a positioned on the surface 138. In the exemplary embodiment of FIGS. 6-10, the spacing member 130a is positioned on the surface 138 adjacent the edge portion 146. However, the spacing member 130a may be positioned at any location on the surface 138 that enables the spacing member 130a to function as described herein. Each filter element layer 132 also includes another spacing member 130b positioned on the surface 140. In the exemplary embodiment of FIGS. 6-10, the spacing member 130b is positioned on the surface 140 adjacent the edge portion 148. However, the spacing member 130b may be positioned at any location on the surface 140 that enables the spacing member 130b to function as described herein.

One or more other spacing members 130 may optionally be positioned on the surfaces 138 and/or 140. For example, in the exemplary embodiment of FIGS. 6-10, four spacing members 130c, 130d, 130e, and 130f are positioned on the surface 138 and four spacing members 130g, 130h, 130i, and 130j are positioned on the surface 140. Specifically, the spacing members 130c, 130d, 130e, and 130f are positioned on the surface 138 such that the spacing members 130c, 130d, 130e, and 130f each extend radially from the edge portion 148 to the edge portion 146. The spacing members 130c, 130d, 130e, and 130f are spaced apart along the surface 138 approximately 90° from each other. Similarly, the spacing members 130g, 130h, 130i, and 130j are positioned on the surface 140 such that the spacing members 130g, 130h, 130i, and 130j each extend radially from the edge portion 148 to the edge portion 146. The spacing members 130g, 130h, 130i, and 130j are spaced apart along the surface 140 approximately 90° from each other. The spacing members 130c-j facilitate reinforcing the body 136 of the filter element layer 132. For example, the spacing members 130c-j facilitate maintaining an approximately consistent amount of spacing between adjacent filter element layers 132 along the surfaces 138 and 140 of the filter element layers 132.

Although eight spacing members 130c-j are shown, the body 136 of each of the filter element layers 132 may include any number of spacing members 130 in addition to the spacing members 130a and 130b. Moreover, the surfaces 138 and 140 may each include any number of spacing members 130 in addition to the spacing members 130a and 130b, respectively. Furthermore, the spacing members 130 that are in addition to the spacing members 130a and 130b (e.g., the spacing members 30c-j) may each have any other suitable location on the body 136 than is shown that enables the spacing members 130 to function as described and/or illustrated herein. The reference numerals 130a-j are used in FIGS. 9 and 10 for reference only.

Referring again to FIG. 7, to assemble the filter 114, the filter element layers 132 are laminated together with the spacing members 130 as shown in FIG. 7. Specifically, the filter element layers 132 are stacked on top of each other with the spacing members 130 extending between adjacent filter element layers 132 to form the laminate structure of the filter 114 shown in FIG. 7. In the exemplary embodiment of FIGS. 6-10, the filter element layers 132 are stacked such that the filter element layers 132 extend approximately parallel to each other. For example, in the exemplary embodiment of FIGS. 6-10, the surfaces 138 and 140 of each filter element layer 132 extend approximately parallel to the surfaces 138 and 140 of the other filter element layers 132. However, the filter element layers 132 may alternatively extend at one or more non-parallel angles relative to each other. In the exemplary embodiment, the filter 114 has a cylindrical shape such that the filter 114 is a radial flow filter. However, alternatively the filter 114 may include any other suitable shape(s) that enables the filter assembly 110 to function as described and/or illustrated herein.

As should be apparent from FIG. 7, the orientation of each filter element layer 132 is inverted relative to the orientation of the adjacent filter element layers 132. Specifically, each filter element layer 132 is positioned relative to the adjacent filter element layers 132 such that the surface 138 of the particular filter element layer 132 faces (also referred to herein as opposes) the surface 138 of one of the adjacent filter element layers 132 and the surface 140 of the particular filter element layer 132 faces the surface 140 of the other adjacent filter element layer 132.

Although in the exemplary embodiment of FIGS. 6-10 the outermost filter element layers 132a and 132b shown in FIG. 7 each include a spacing member 130 positioned on the corresponding surface 140, alternatively the filter element layers 132a and/or 132b may not include a spacing member 130 positioned on the corresponding surface 140. Moreover, in some alternative embodiments, the structure of the filter 114 is arranged such that one or both of the outermost filter element layers 132a and 132b has an outermost surface 138 instead of an outermost surface 140 as shown in FIG. 7. In such an embodiment wherein one or both of the outermost filter element layers 132a and 132b has an outer most surface 138, the filter element layers 132a and/or 132b may or may not include a spacing member 130 positioned on the corresponding surface 138.

The laminate structure of the filter 114 shown in FIG. 7 may be held together using any suitable method, structure, means, and/or the like. In the exemplary embodiment of FIGS. 6-10, the spacing members 130 are each tape that has an adhesive on both sides thereof such that each spacing member 130 adheres to both of the adjacent filter element layers 132 that the particular spacing member 130 extends between. The tape used as the spacing members 130 may be any suitable type of tape, such as, but not limited to, seal tape and/or the like. The spacing members 130 are not limited to being tape. Rather, the spacing members 130 may each be fabricated from any suitable material(s) and include any suitable structure that enables the spacing members 130 to function as described and/or illustrated herein. Other examples of the material(s) and/or structure(s) of the spacing members 130 include, but are not limited to, an adhesive (such as, but not limited to, epoxy, glue, and/or the like), string, plastic, rubber, silicone, and/or the like. Although in the exemplary embodiment of FIGS. 6-10 the spacing members 130 are tape and therefore include an adhesive, in some embodiments the spacing members 130 do not include an adhesive.

As described above, the spacing members 130 space apart the filter element layers 132 to define the openings 134 between the filter element layers 132. Specifically, the openings 134 are defined between the surfaces 138 and 140 of adjacent filter element layers 132. Along a length $L_2$ of the filter 114, the openings 134 alternate between being closed, by the spacing member 130, and being open on both an intake side portion 150 of the filter 114 and a discharge side portion 152 of the filter 114.

In the exemplary embodiment of FIGS. 6-10, the spacing elements 130 space apart the surfaces 138 and 140 of adjacent filter element layers 132 approximately the same amount, indicated herein by a width $W_2$ of the openings 134, along an approximate entirety of the surfaces 138 and 140 of the adjacent filter element layers 32. Accordingly, in the exemplary embodiment of FIGS. 6-10, the openings 134 have approximately the width $W_2$ along an approximate entirety of the surfaces 138 and 140 of the adjacent filter element layers 132, excepting portions of the openings 134 that are partially or completely blocked by a spacing member 130. Of course, in some embodiments the spacing between adjacent filter element layers 132 may not be exactly the same along the approximate entirety of the surfaces 138 and 140 of the adjacent filter element layers 132 due to, for example, but not limited to, manufacturing tolerances, deformation of the filter element layers 132 during operation of the filter assembly 110, and/or the like. Moreover, in some embodiments, the spacing between adjacent filter element layers 132 is approximately the same along only a portion of the surfaces 138 and 140 of the filter element layers 32, such as, but not limited to, along at least approximately 80% or at least approximately 90% of the surfaces 138 and 140 of the filter element layers 132. The size of each of the spacing members 130, including any and/or all components thereof, is selected to provide the desired amount of spacing (i.e., the width $W_2$ of the openings 134) between the adjacent filter element layers 132, whether or not the amount of spacing is variable or is approximately the same along the surfaces 138 and 140 of the filter element layers 132.

In the exemplary embodiment of FIGS. 6-10, each of the filter element layers 132 is a separate layer. Alternatively, one or more of the adjacent pairs of filter element layers 132 may be formed from a single uninterrupted length of material that is bent to form the two adjacent filter element layers 132 such that the edge portions 146 or 148 of the adjacent pair of filter element layers 132 are connected together. In some embodiments, all of the filter element layers 132 are formed from single uninterrupted length of material bent such that the adjacent pairs of filter element layers 132 are connected together at alternating edge portions 146 and 148.

Although thirty filter element layers 132 are shown in FIG. 7, the filter 114 may include any number of filter element layers 132. Moreover, the filter 114 may include any number of spacing members 130 for spacing apart any number of filter element layers 132.

In operation, fluid enters the cavity 118 of the filter housing 112 through the intake openings 120. The fluid flows into the openings 134 that are open on the intake side portion 150 and through the filter element layers 132, thereby being filtered by the filter element layers 132. The filtered fluid then flows out the openings 134 that are open on the discharge side portion 152 of the filter 114 and exits the filter assembly 110 through the discharge opening 122 of the filter housing 112. The filter assembly 110 may filter any fluid, such as, but not limited to, a liquid, a slurry, a gas, a gas containing solid particulates, a sludge, a slush, and/or the like. The filter assembly 110 may be used in any suitable environment and with any suitable machine, system, structure, and/or the like, such as, but not limited to, within a vehicle (not shown) and/or the like, such as, but not limited to, a tank, an aircraft, a watercraft, an automobile, and/or the like.

Figure 11:
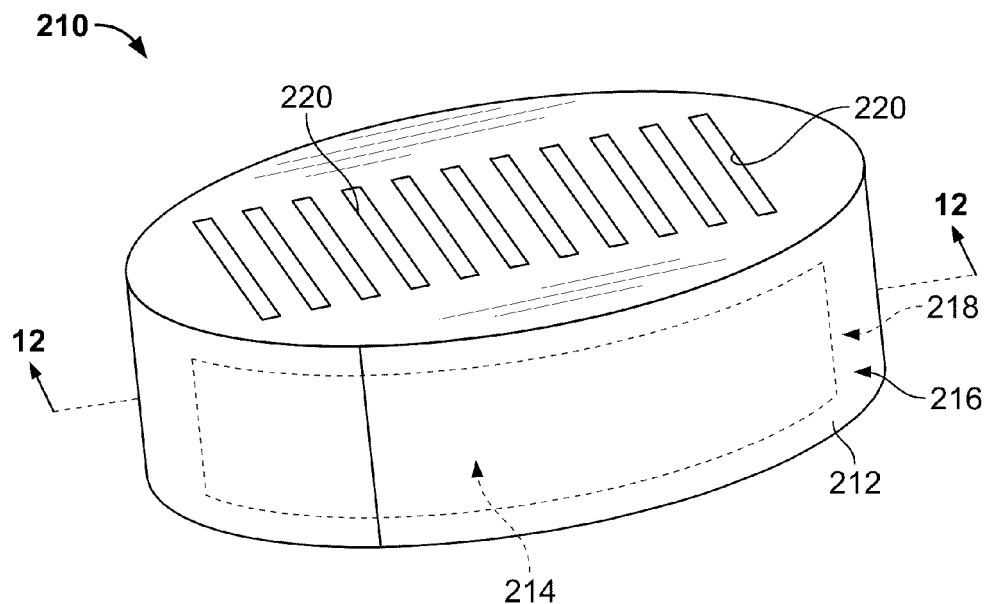
FIG. 11 is a perspective view of another exemplary embodiment of a filter assembly.
Figure 12:
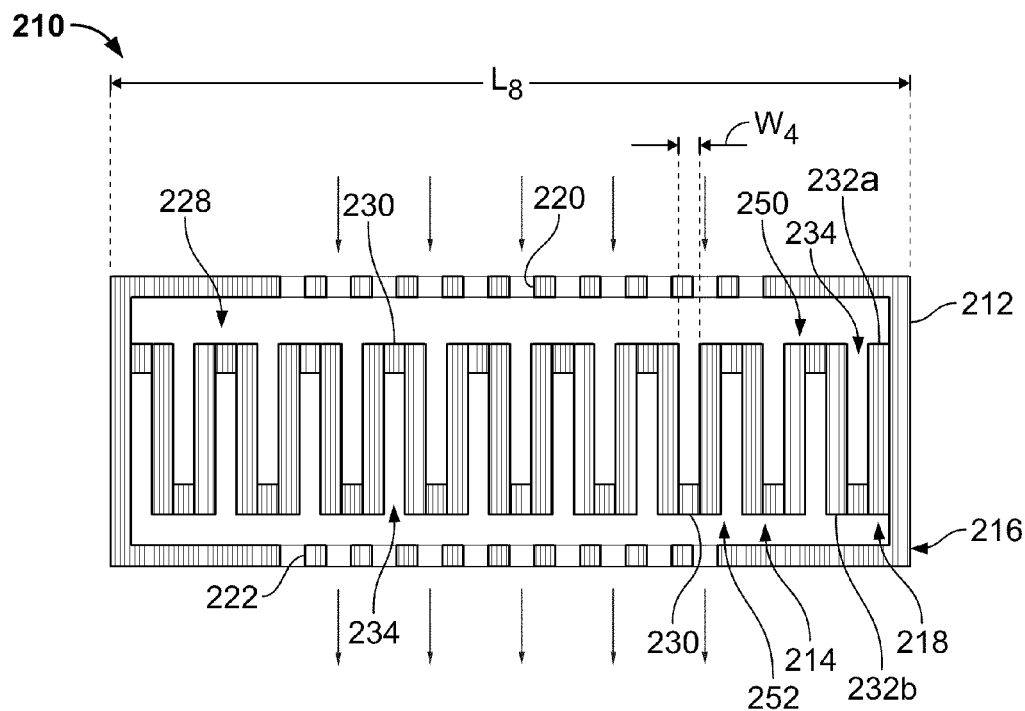
FIG. 12 is a cross-sectional view of the filter assembly shown in FIG. 11 taken along line 12-12 of FIG. 11.

FIG. 11 is a perspective view of another exemplary embodiment of a filter assembly 210. FIG. 12 is a cross-sectional view of the filter assembly 210 taken along line 12-12 of FIG. 11. The filter assembly 210 includes a housing 212 and a laminate filter 214 held by the housing 212. The housing 212 includes a body 216 that defines an internal cavity 218. The housing body 216 includes a plurality of intake openings 220 that communicate with the cavity 218 for receiving a flow of fluid into the cavity 118. The housing body 216 also includes a plurality of discharge openings 222 (not shown in FIG. 11) that communicates with the cavity 218 for discharging fluid from the cavity 218. As will be described below, the filter 214 is held within the cavity 218 for filtering the fluid flowing through the cavity 218.

In the exemplary embodiment of FIGS. 11-16, the housing 212 has an approximately cylindrical shape. However, alternatively the housing 212 may include any other suitable shape(s) that enables the filter assembly 210 to function as described and/or illustrated herein. Moreover, the intake openings 220 and the discharge openings 222 may each include any suitable shape(s) and may each be located anywhere on the housing body 216, including anywhere relative to each other, that enables the filter assembly 210 to function as described and/or illustrated herein. Although eleven intake openings 220 and ten discharge opening 222 are shown, the housing body 216 may include any number of intake openings 220 and any number of discharge openings 222, whether or not the number of intake openings 220 is the same as the number of discharge openings 222.

Figure 13:
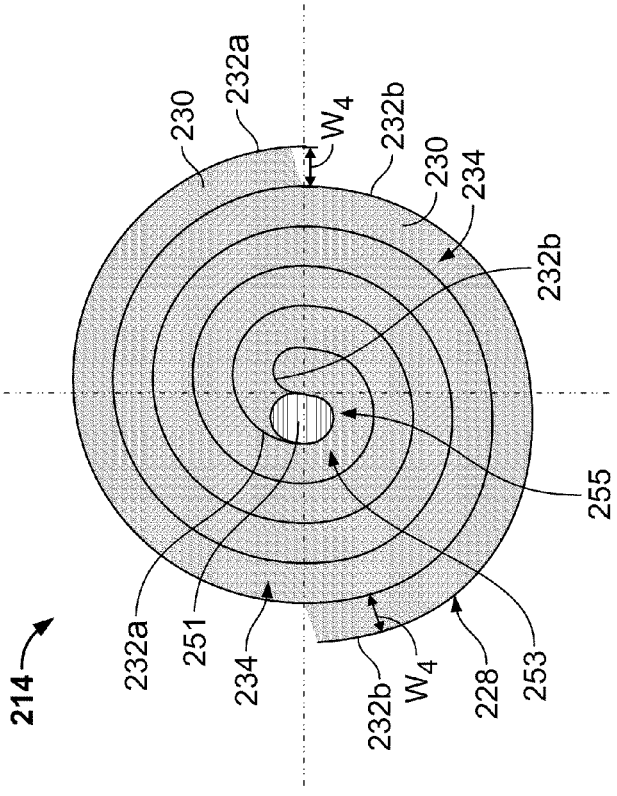
FIG. 13 is a top plan view of an exemplary embodiment of a filter of the filter assembly shown in FIGS. 11 and 12.

FIG. 13 is a top plan view of an exemplary embodiment of the filter 214. Referring now to FIGS. 12 and 13, the filter 214 includes a filter element, generally designated by the reference numeral 228, and a plurality of spacing members 230. The filter element 228 is defined by a pair of filter element layers 232a and 232b that are laminated together with the spacing members 230. As will be described below, the spacing members 230 extend between the filter element layers 232a and 232b. The spacing members 230 thereby space apart the filter element layers 232a and 232b to define openings 234 between the filter element layers 232.

Figure 14:
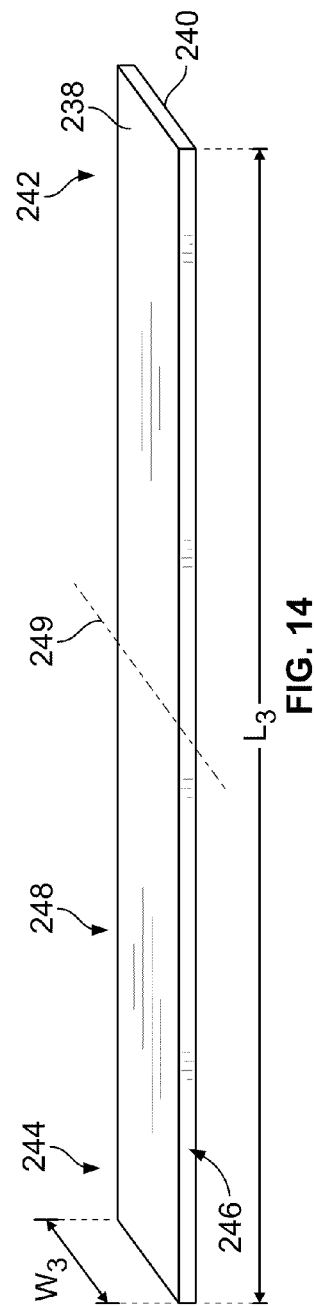
FIG. 14 is a perspective view of an exemplary embodiment of a body used to form two filter element layers of the filter assembly shown in FIGS. 11 and 12.

FIG. 14 is a perspective view of an exemplary embodiment of a body 236 used to form the filter element layers 232a and 232b. In the exemplary embodiment of FIGS. 10-16, the filter element layers 232a and 232b are formed from the single elongate body 236. Alternatively, the filter element layers 232a and 232b are formed from two separate bodies (not shown; such as, but not limited to, the two separate bodies that would be formed by severing the body 236 along a centerline 249 of a length $L_3$ of the body 236), whether or not end portions of the two bodies are connected together during assembly of the filter 214. The body 236 includes a pair of opposite surfaces 238 and 240. The body 236 extends the length $L_3$ between a pair of opposite end portions 242 and 244. The body 236 extends a width $W_3$ between a pair of opposite edge portions 246 and 248 that intersect the surfaces 238 and 240. In the exemplary embodiment of FIGS. 11-16, the body 236 is elongate and includes an approximately rectangular shape. However, alternatively the body 236 may include any other suitable shape(s) that enables the filter assembly 210 to function as described and/or illustrated herein.

FIGS. 15 and 16 are top and bottom plan views, respectively, of the body 236. The body 236 includes a spacing member 230a positioned on the surface 238. In the exemplary embodiment of FIGS. 11-16, the spacing member 230a is positioned on the surface 238 adjacent the edge portion 246. The spacing member 230a extends from approximately the centerline 249 of the length $L_3$ of the body 236 to the end portion 244. Alternatively, the spacing member 230a may be positioned at any other suitable location on the surface 238 that enables the spacing member 230a to function as described herein. The body 236 also includes another spacing member 230b positioned on the surface 240. In the exemplary embodiment of FIGS. 11-16, the spacing member 230b is positioned on the surface 240 adjacent the edge portion 248. The spacing member 230b extends from approximately the centerline 249 of the length $L_3$ of the body 236 to the end portion 242. Alternatively, the spacing member 230b may be positioned at any other suitable location on the surface 240 that enables the spacing member 230b to function as described herein.

One or more other spacing members 230 may optionally be positioned on the surfaces 238 and/or 240. For example, in the exemplary embodiment of FIGS. 11-16, two spacing members 230c and 230d are positioned on the surface 238 and two spacing members 230e and 230f are positioned on the surface 240. Specifically, the spacing members 230c and 230e are positioned on the surfaces 238 and 240, respectively, approximately on the centerline 249 of the body 236. The spacing members 230d and 230f are positioned on the surfaces 238 and 240, respectively, at respective lengths $L_4$ and $L_5$ from the centerline 249. The spacing members 230c-f facilitate reinforcing the body 36. For example, when the filter 214 is assembled as shown in FIG. 13, the spacing members 230c-f facilitate maintaining an approximately consistent amount of spacing between the filter element layers 232a and 232b along a path of the filter element layers 232a and 232b.

Although four spacing members 230c-f are shown, the body 236 may include any number of spacing members 230 in addition to the spacing members 230a and 230b. Moreover, the surfaces 238 and 240 may each include any number of spacing members 230 in addition to the spacing members 230a and 230b, respectively. Furthermore, the spacing members 230 that are in addition to the spacing members 230a and 230b (e.g., the spacing members 230c-f) may each have any other suitable location on the body 236 than is shown that enables the spacing members 230 to function as described and/or illustrated herein.

Referring again to FIGS. 12 and 13, to assemble the filter 214, the filter element layers 232a and 232b are laminated together with the spacing members 230 as shown in FIGS. 12 and 13. Specifically, the body 236 is bent along the centerline 249 such that either the surfaces 238 of the filter element layers 232a and 232b or the surfaces 240 of the filter element layers 232a and 232b generally face each other, with the spacing members 230 extending between the filter element layers 232a and 232b. In the exemplary embodiment of FIGS. 11-16, the body 236 is bent such that the surfaces 238 of the filter element layers 232a and 232b face each other. It is to be understood that the filter element layers 232a and 232b could be assembled in an inverse manner to that of the exemplary embodiment such that the surfaces 140 of the filter element layers 232a and 232b face each other. Such an inverse assembly will not be described or illustrated in greater detail herein. The filter element layers are optionally bent around a central hub 251 as shown in FIG. 13. The filter element layers 232a and 232 are brought toward each other until the spacing members 230a, 230c, and 230d engage the surfaces 238 of the filter element layers 232a and 232b to form the laminated structure of the filter 14. The laminated filter element layers 232a and 232b and spacing members 230 are rolled up from the centerline 249 to form the spiral structure shown in FIG. 13. In other words, the laminated filter element layers 232a and 232b and spacing members 230 are rolled up such that the each of the filter element layers 232a and 232b (and spacing members 230) extends a length $L_6$ and $L_7$ (FIGS. 15 and 16), respectively, along an approximately spiral path.

In the exemplary embodiment, the filter 214 has a circular shape such that the filter 14 is a circular filter. However, alternatively the filter 214 may include any other suitable shape(s) that enables the filter assembly 210 to function as described and/or illustrated herein.

The laminate structure of the filter 214 shown in FIGS. 12 and 13 may be held together using any suitable method, structure, means, and/or the like. In the exemplary embodiment of FIGS. 11-16, the spacing members 230 are each tape that has an adhesive on both sides thereof such that each spacing member 230 adheres to both of the filter element layers 232a and 232b. The tape used as the spacing members 230 may be any suitable type of tape, such as, but not limited to, seal tape and/or the like. The spacing members 230 are not limited to being tape. Rather, the spacing members 230 may each be fabricated from any suitable material(s) and include any suitable structure that enables the spacing members 230 to function as described and/or illustrated herein. Other examples of the material(s) and/or structure(s) of the spacing members 230 include, but are not limited to, an adhesive (such as, but not limited to, epoxy, glue, and/or the like), string, plastic, rubber, silicone, and/or the like. Although in the exemplary embodiment of FIGS. 11-16 the spacing members 230 are tape and therefore include an adhesive, in some embodiments the spacing members 230 do not include an adhesive.

As described above, the spacing members 230 space apart the filter element layers 232a and 232b to define the opening 134 between the filter element layers 232a and 232b. Specifically, the opening 34 is defined between the surfaces 138 of the filter element layers 232a and b and therefore extends a length along an approximately spiral path. As can be seen in FIG. 12, along a length $L_8$ of the filter 214, the opening 134 alternates between being closed, by the spacing member 230a or 230b, and being open on both an intake side portion 250 of the filter 214 and a discharge side portion 252 of the filter 214.

In the exemplary embodiment of FIGS. 11-16, the spacing elements 230 space apart the surfaces 238 of the filter element layers 232a and 232b approximately the same amount, indicated herein by a width $W_4$ of the opening 134, along an approximate entirety of the lengths $L_4$ and $L_5$ of the filter element layers 232a and 232b, respectively. Accordingly, in the exemplary embodiment of FIGS. 11-16, the opening 134 has approximately the width $W_4$ along an approximate entirety of the surfaces 138 of the filter element layers 232a and 232b, excepting portions of the opening 134 that are partially or completely blocked by a spacing member 230. Of course, in some embodiments the spacing between adjacent filter element layers 232 may not be exactly the same along the approximate entirety of the lengths $L_4$ and $L_5$ of the filter element layers 232a and 232b, respectively, due to, for example, but not limited to, manufacturing tolerances, deformation of the filter element layers 232a and/or 232b during operation of the filter assembly 210, and/or the like. Moreover, in some embodiments, the spacing between the filter element layers 232a and 232b is approximately the same along only a portion of the lengths $L_4$ and $L_5$ of the filter element layers 232a and 232b, such as, but not limited to, along at least approximately 80% or at least approximately 90% of the lengths $L_4$ and $L_5$ of the filter element layers 232a and 232b, respectively. The size of each of the spacing members 230, including any and/or all components thereof, is selected to provide the desired amount of spacing (i.e., the width $W_4$ of the opening 234) between the filter element layers 232a and 232b, whether or not the amount of spacing is variable or is approximately the same along the lengths $L_4$ and $L_5$ of the filter element layers 232a and 232b, respectively.

In the exemplary embodiment of FIGS. 11-16, end portions 253 and 255 of the filter element layers 232a and 232b are connected together due to the manner of assembly of the filter 214 described above. Alternatively, the end portions 253 and 255 may not be connected. Although two filter element layers 232a and 232b are shown in the embodiment of FIGS. 11-16, the filter 214 may include any number of filter element layers 232. Moreover, the filter 214 may include any number of spacing members 230 for spacing apart any number of filter element layers 232.

In operation, fluid enters the cavity 218 of the filter housing 212 through the intake openings 220. The fluid flows into the portions of the opening 234 that are open on the intake side portion 250 and through the filter element layers 232a and 232b, thereby being filtered by the filter element layers 232a and 232b. The filtered fluid then flows out the portions of the opening 234 that are open on the discharge side portion 252 of the filter 214 and exits the filter assembly 210 through the discharge openings 222 of the filter housing 212. The filter assembly 210 may filter any fluid, such as, but not limited to, a liquid, a slurry, a gas, a gas containing solid particulates, a sludge, a slush, and/or the like. The filter assembly 210 may be used in any suitable environment and with any suitable machine, system, structure, and/or the like, such as, but not limited to, within a gas mask canister (not shown) and/or the like.

The filter elements layers 32, 132, and 232 may each be fabricated from any suitable material(s) that enable the filters 14, 114, and 214 to function as described and/or illustrated herein, such as, but not limited to, paper and/or the like.

The embodiments described and/or illustrated herein provide a filter that may have a more even flow distribution across a surface area thereof as compared with at least some known filters. The embodiments described and/or illustrated herein provide a filter that may have a reduced pressure drop across the filter, an increased efficiency, and/or an increased lifetime than at least some known filters. The embodiments described and/or illustrated herein provide a filter that may eliminate surface area blockage due to particulates and/or debris that collects in the pleat corners of at least some known pleated filters. The embodiments described and/or illustrated herein provide a filter that may have an increased strength as compared with at least some known filters. The embodiments described and/or illustrated herein provide a filter that may be more easily manufactured that at least some known filters. The embodiments described and/or illustrated herein provide a filter that may use less material than at least some known filters. The embodiments described and/or illustrated herein provide a filter having edges that may be more easily sealed than at least some known filters.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

While the subject matter described and/or illustrated herein has been described in terms of various specific embodiments, those skilled in the art will recognize that the subject matter described and/or illustrated herein can be practiced with modification within the spirit and scope of the claims.

What is claimed is:

1. A filter assembly comprising:
    a housing; and
    a filter held within the housing, the filter comprising:
        a spacing member; and
        a filter element comprising two layers laminated together with the spacing member such that the spacing member extends between the filter element layers, wherein the spacing member spaces apart the filter element layers to define an opening between the filter element layers, the opening comprising an end, the spacing member defining a boundary at the end of the opening that closes the end of the opening.

2. The filter assembly according to claim 1, wherein the filter element layers are spaced apart by the spacing member approximately the same amount along an approximate entirety of opposing surfaces of the filter element layers.

3. The filter assembly according to claim 1, wherein the filter element layers extend approximately parallel to each other.

4. The filter assembly according to claim 1, wherein each of the filter element layers extends a length along an approximately spiral path.

5. The filter assembly according to claim 1, wherein the filter comprises one of a circular filter, a rectangular filter, and a radial flow filter.

6. The filter assembly according to claim 1, wherein the spacing member comprises at least one of an adhesive, an adhesive tape, an adhesive string, and an adhesive plastic.

7. The filter assembly according to claim 1, wherein the end of the opening is an intake end, the opening further comprising a discharge end, the opening being configured to discharge fluid that has traveled through one of the filter element layers through the discharge end.

8. The filter element assembly according to claim 1, wherein the filter element layers are first and second filter element layers, the opening is a first opening, and the spacing member is a first spacing member, the filter further comprising a second spacing member, the filter element further comprising a third layer, the first, second, and third filter layers being laminated together with the first and second spacing elements such that the second spacing element extends between the second and third filter element layers, wherein the second spacing member spaces apart the second and third filter element layers to define a second opening between the second and third filter element layers, the first and second openings comprising intake ends and discharge ends, the first spacing member forming a boundary at the intake end of the first opening that closes the intake end of the first opening, the second spacing member forming a boundary at the discharge end of the second opening that closes the discharge end of the second opening.

9. The filter element assembly according to claim 1, wherein one of the filter element layers has opposite first and second edge portions, the spacing member being a first spacing member comprising a strip of material that extends a length along the first edge portion, the filter comprising a second spacing member comprising a strip of material that extends a length along the second edge portion.

10. A filter comprising:
   first and second spacing members; and
   a filter element comprising first, second, and third layers extending approximately parallel to each other, the first, second, and third filter element layers being laminated together with the first and second spacing members such that the first spacing member extends between the first and second filter element layers and the second spacing member extends between the second and third filter element layers, wherein the first spacing member spaces apart the first and second filter element layers to define a first opening between the first and second filter element layers, and the second spacing member spaces apart the second and third filter element layers to define a second opening between the second and third filter element layers, the second filter element layer comprising opposite first and second edge portions, the first spacing member extending adjacent the first edge portion of the second filter element layer, the second spacing member extending adjacent the second edge portion of the second filter element layer.

11. The filter according to claim 10, wherein the second filter element layer is inverted relative to the first filter element layer and relative to the third filter element layer.

12. The filter according to claim 10, wherein the first and second openings comprise intake ends and discharge ends, the first spacing member forming a boundary at the intake end of the first opening that closes the intake end of the first opening, the second spacing member forming a boundary at the discharge end of the second opening that closes the discharge end of the second opening.

* * * * *